(12) United States Patent
Oberti

(10) Patent No.: US 6,308,803 B1
(45) Date of Patent: Oct. 30, 2001

(54) BRAKE-DISK WITH VISUAL WEAR CONTROL MEANS

(75) Inventor: Leone Oberti, Lenna (IT)

(73) Assignee: Brembo S.p.A., Curno (IT)

( * ) Notice: Subject to any disclaimer, the term of this patent is extended or adjusted under 35 U.S.C. 154(b) by 0 days.

(21) Appl. No.: 09/375,850

(22) Filed: Aug. 17, 1999

(30) Foreign Application Priority Data

Sep. 11, 1998 (EP) .................................................. 98830534

(51) Int. Cl.$^7$ ...................................................... F16D 66/00
(52) U.S. Cl. ................................. 188/1.11 W; 188/250 B
(58) Field of Search ........................ 188/1.11 W, 1.11 R, 188/250 G, 250 E, 250 B; 192/30 W; 116/208

(56) References Cited

U.S. PATENT DOCUMENTS 1,949,670 * 3/1934 Winters .

FOREIGN PATENT DOCUMENTS

| | | |
|---|---|---|
| 2215529 | 10/1973 | (DE) . |
| 4002695 | 8/1991 | (DE) . |
| 19512934 | 10/1996 | (DE) . |
| 0529236 | 3/1993 | (EP) . |
| 0606800 | 7/1994 | (EP) . |
| 0670434 | * 2/1995 | (EP) . |
| 0670434 | 9/1995 | (EP) . |

* cited by examiner

*Primary Examiner*—Christopher P. Schwartz
*Assistant Examiner*—C. T. Bartz
(74) *Attorney, Agent, or Firm*—Bucknam and Archer

(57) ABSTRACT

A brake disc is provided with a visual control means of its wear conditions on at least one of its opposite side faces in correspondence of the peripheral braking strip on which the braking pads act by friction. The visual control means is in the form of a notch in the circumference of the brake disc or a circumferential throat-like or angle groove formed in the outer edge of the brake disc.

11 Claims, 2 Drawing Sheets

BRAKE-DISK WITH VISUAL WEAR CONTROL MEANS

BACKGROUND OF THE INVENTION

1. Field of the Invention

The present invention relates to a brake disc with wear visual control means.

More particularly, the present invention relates to a brake disc with at least a wear visual control means that allows to control visually the wear conditions of said brake disc.

2. Description of the Related Art

As is known, braking devices are units able to slow or stop a vehicle or, in general, a moving mass, by transforming the absorbed kinetic energy into thermal energy.

A type of braking device used in motorcars has a disc constituted by a metal brake disc, fixed to the wheel axis, astride of which pliers act that are fixed to the articulated stub axle or the hub-bearer of the vehicle and provided with braking gaskets, generally known as "brake pads". The brake disc comprises a braking strip, provided with a swept braking surface on both faces, and a bell or hub fixed to the wheel axis.

The pliers, activated by suitable means, push the brake pads against each swept surface of the braking strip. The braking action is therefore produced by the friction between the brake pads and the swept surface of the braking strip of the brake disc.

With the braking operations following to each other, both the brake pads and the swept surface of the braking strip of the disc, on which the brake pads act by friction, are subjected to wear.

When the brake pad and/or the braking strip of the disc have undergone the maximum allowed wear indicated by the manufacturer, they must be replaced.

To control the wear level of the brake pads, sensors are used at present which are embedded within the inside of said brake pads at a prefixed depth. Following the wear of the brake pads due to the braking operations following to each other, said sensors emerge on the surface, get in touch with the material discs are made from, and cause the intervention of an alarm signal, usually constituted by an electric or electronic device that causes the lighting of a LED or the like.

As concerns, instead, the wear of the brake discs, at present wear control is made by disassembling the wheels and comparing the measure found with the minimum value usually indicated on said brake discs.

Obviously, the carrying out of said control is time and work consuming.

Object of this invention is to obviate the aforementioned drawbacks.

More particularly, object of this invention is to provide brake discs with means allowing to carry out in a simple and economic manner periodic controls of the wear of the braking strip.

BRIEF SUMMARY OF THE INVENTION

According to the present invention, these and other objects are achieved by providing the brake disc with a means for the visual control of its wear level, engraved on at least one of its opposite side faces in correspondence with the peripheral braking strip on which the brake pads act by friction; said visual control means having a depth greater than the maximum wear level allowed on each face.

These visual control means may be at least an impression, a notch or a circumferential throat-like or angle-shaped groove, or a combination thereof.

Said means can be easily seen by the naked eye, and from the visual examination of their form, size, depth and/or their distance from said strips, it is possible to make an easy, rapid and economical evaluation of the wear of the brake discs without having recourse to external interventions and/or expensive and time consuming disassembly operations and the like.

Brake disc wear, due to braking operations following to each other, may be therefore easily controlled visually by checking the conditions of said means; the maximum allowed wear corresponds to the entire disappearance of said impressions, notches or grooves.

The advantages achieved by the present invention lie essentially in that the wear of the brake discs can be kept under control in a simple, rapid and economical manner by the same users of the vehicles, who, in such conditions, can evaluate the wear of the discs of the braking system of their vehicles, without having recourse to specialised personnel, and can provide for the replacement of the discs in due time and after due consideration, only at the time when they have reached the maximum wear level allowed and advised by the manufacturer.

BRIEF DESCRIPTION OF THE DRAWINGS

The present invention will be better understood thanks to the following detailed description wherein reference is made to the attached drawings which show some embodiments shown only by way of non limiting examples, and wherein.

DETAILED DESCRIPTION OF THE INVENTION

The present description is made with reference to a brake disc of the self-ventilated type, even if the present invention may be applied with the same success to any other type of brake disc, for instance of the solid type.

Figure 1:
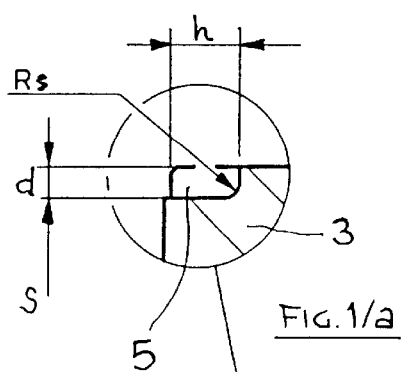
FIGS. 1, 1/a and 1/b show schematic views of a partial cross-section, with enlarged details, of a brake disc on whose opposite braking strips visual control means are obtained having the shape of impressions or niches or of notches.
Figure 1:
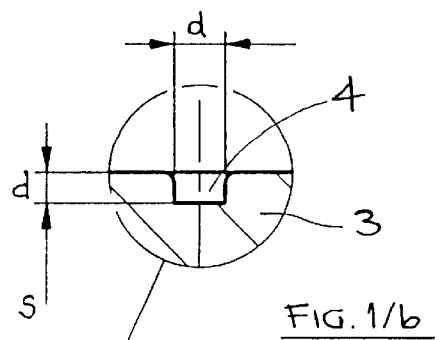
Figure 1:
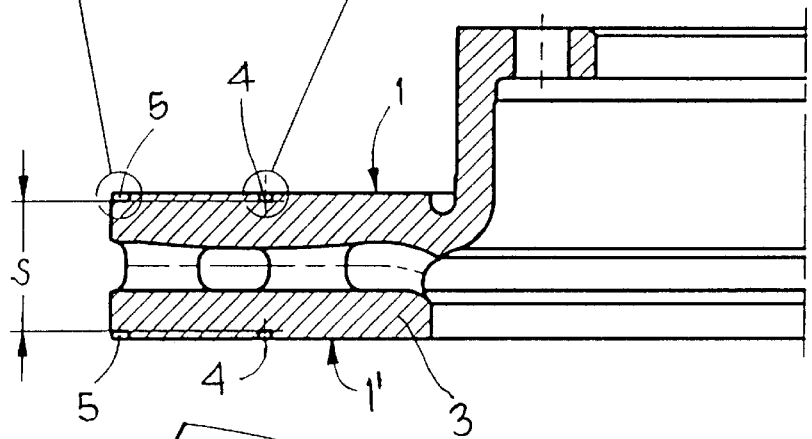
Figure 2:
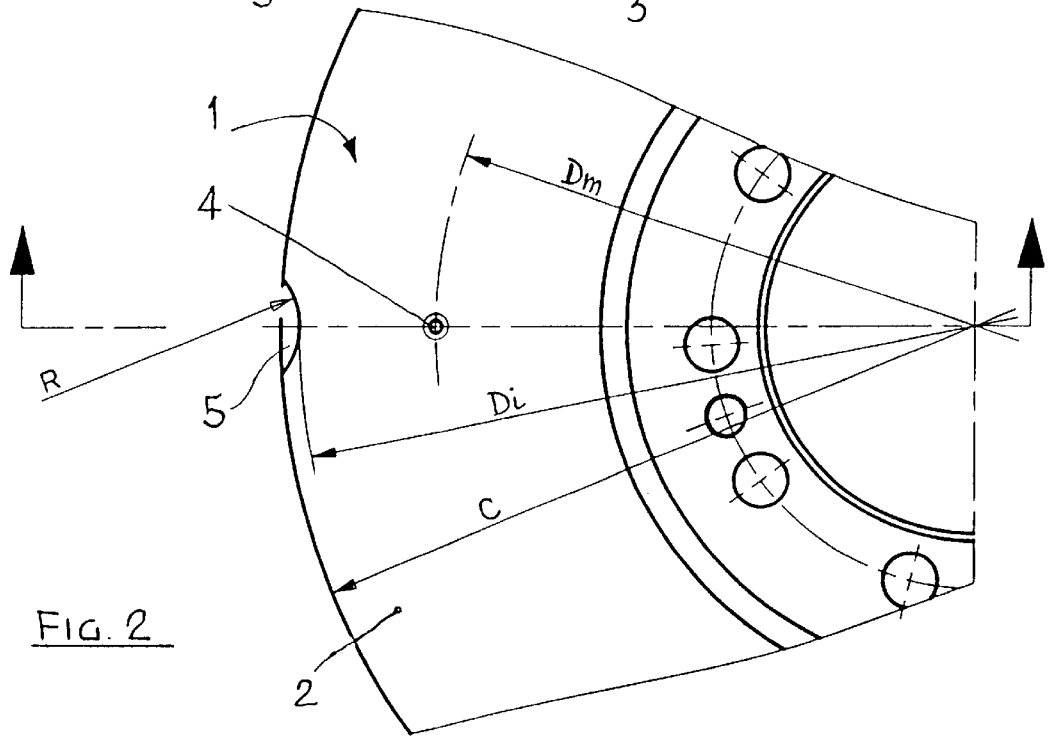
FIG. 2 shows a front schematic view of the same brake disc of FIG. 1.

With reference to FIGS. 1 and 2, on at least one or on both opposite parallel side faces 1, 1' of a brake disc 3, there are provided one or more impressions, niches or flat-bottom holes 4, obtained in correspondence of the peripheral braking strip 2, having any diameter "Dm", on which the brake pads act by friction. The depth "p" of said niches, impressions or holes 4 is not greater than the maximum wear level allowed on each face 1, 1' of the brake disc. Said niches, impressions or holes 4 may be opposite to each other and the distance between the respective bottoms is not smaller to the minimum allowed thickness "S" of the brake disc 3, with respect to the maximum wear level allowed and advised by the manufacturer. The impressions or hole 4 are visible to the naked eye and can be easily controlled by users. When the impressions or holes 4 have a very reduced depth, this means that the brake disc is worn and must be controlled more frequently, and when the impressions disappear or are just visible, the brake disc has reached its maximum wear limit and must be replaced. At this time, it is necessary the intervention of specialised technicians to disassemble the worn disc and to replace it.

In the same way, notches 5 with a radius "R" may be adopted as visual control means, which are obtained along one or both the opposite edges of the external circumference of each face 1, 1'. The depth of said notches corresponds to an internal diameter "Di" which extends into the peripheral braking strip 2 on which the brake pads act. In case of notches 5 obtained on both edges, the distance between said opposite edges 5 is not smaller than the minimum allowed thickness "S" of the brake disc 3, with respect to the maximum wear level allowed and advised by the manufacturer. In the same way, depth "p" of each notch 5 is not higher that the maximum wear level allowed on each face 1, 1' of the brake disc. Notches 5 are visible to the naked eye and can be controlled by users. When the notches 5 have a very reduced depth, this means that the brake disc 3 is worn and must be controlled more frequently, and when the notches disappear or are just visible, it is necessary to replace the brake disc with the intervention of specialised technicians to disassemble the worn disc and to replace it.

Figure 3:
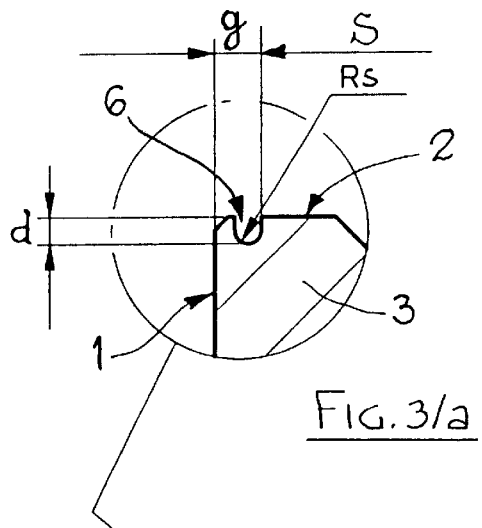
FIGS. 3 and 3/a show the schematic views of a partial cross-section, with an enlarged detail, of a brake disc on whose opposite braking strips visual control means are obtained having the shape of circumferential throat-like grooves.
Figure 3:
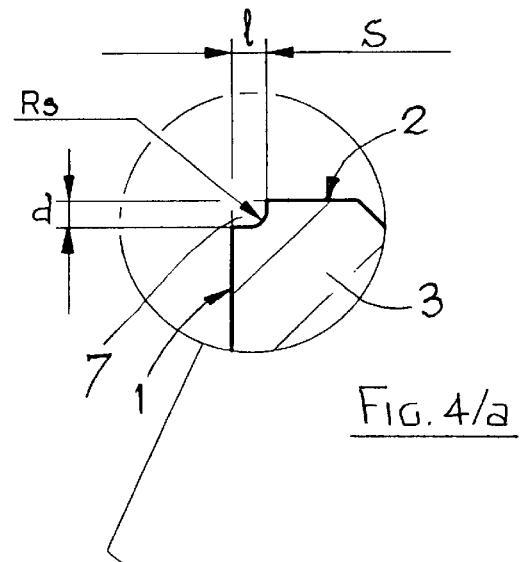
Figure 3:
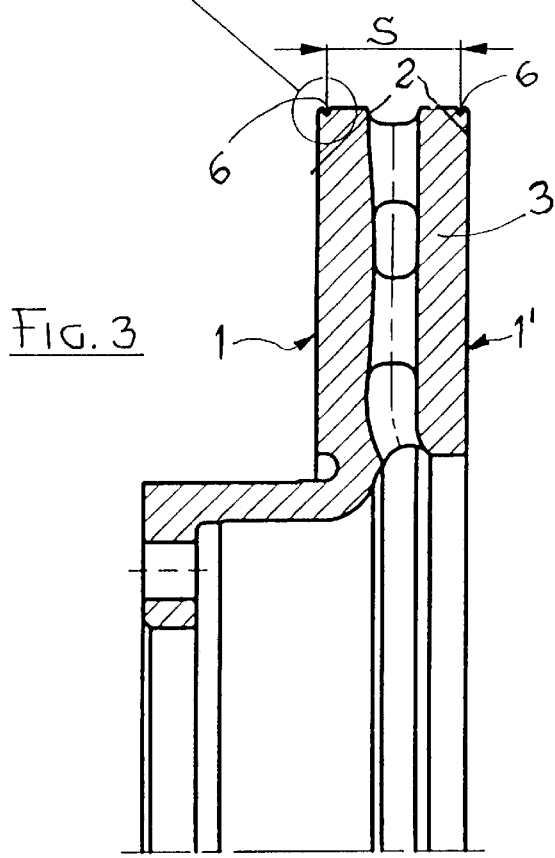
Figure 4:
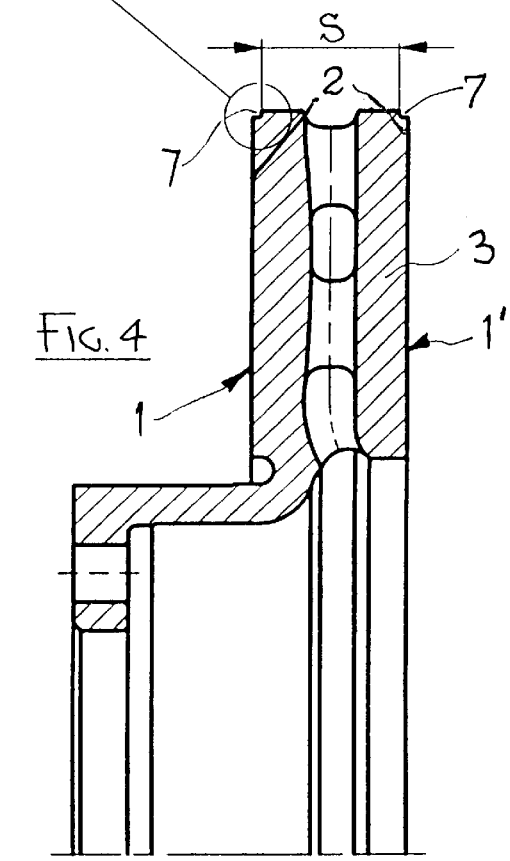
FIGS. 4 and 4/a show the schematic views of a partial cross-section, with an enlarged detail, of a brake disc on whose opposite braking strips visual control means are obtained having the shape of circumferential angle grooves.

FIGS. 3 and 4 show two other solutions as valid and effective as the first one for the visual control means of the present invention. The solution of FIG. 3 provides for circumferential throat-like grooves 6, and the solution of FIG. 4 provides for the adoption of circumferential angle grooves 7.

Said grooves 6, 7 are obtained along one or both the opposite edges of the external circumference of the braking strip on which the brake pads act. The distance "g" between the internal edge of the throat-like groove 6 and faces 1, 1', or the width "λ" of the circumferential angle grooves 7, with respect to said faces 1, 1', is not greater then the maximum wear level allowed on each face 1, 1'. In case of circumferential grooves 6,7 obtained on both edges, the double of said distance "g" or width "λ" is such as not to exceed the difference between the starting value and the minimum value of the thickness "S" of disc 3, with respect to the maximum wear level allowed and advised by the manufacturer. Also the circumferential grooves 6,7 are visible to the naked eye and can be easily controlled by users.

At the time when the distance "g" between faces 1 and the internal edges of the throat-like grooves 6 or width "λ" of the angle grooves 7 is very reduced, this means that the brake disc 3 is worn and must be controlled more frequently, and when said distances disappear or are just visible, it is necessary to replace the brake disc Then, the worn disc must be disassembled and replaced.

The diameters "d" of holes or niches 4, the width "h" of notches 5, and the depth "p" of the circumferential angle grooves 6, 7, and the connection radiuses "Rs" of said notches 5 and circumferential angle grooves 6,7 are not critical and may have a wide interval range, according to the type of brake disc and its size. In any case, the dimensions and/or the positioning of the visual means of the present invention are such that said means perform their specific function, without limiting in any way the necessary braking effect of the system.

Even though the present invention has been described and illustrated with reference to some preferred embodiments of the same, various changes and variants may be made, in the light of the above teaching. It is therefore understood that the present invention comprises all the changes and variants that fall within the spirit and the protection scope of the appended claims.

What is claimed is:

1. A brake disc provided with a visual control means of its wear level, said brake disc including opposite side faces (1,1') each defining a peripheral braking strip (2) on which opposing brake pads act by friction, said peripheral braking strips each having an external circumferential edge, said visual control means comprising a notch (5) formed along at least one of said external circumferential edges of said peripheral braking strips having a depth not greater than the maximum wear level allowed.

2. The brake disc as defined in claim 1, wherein said wear level visual control means is formed on each of said opposite side faces (1,1').

3. The brake disc as defined in claim 1, wherein the width of said notch (5) extends into said peripheral braking strip (2).

4. A brake disc provided with a visual control means of its wear level, said brake disc including opposite side faces (1,1') each defining a peripheral braking strip (2) on which opposing brake pads act by friction, said peripheral braking strips each having an external circumferential edge, said visual control means comprising a circumferential throat-like groove (6) formed along at least one of said external circumferential edges adjacent said peripheral braking strips.

5. The brake disc as defined in claim 4, wherein said wear level visual control means is formed on each of said opposite side faces (1,1').

6. The brake disc as defined in claim 4, wherein the distance between an internal edge of said throat-like groove and a face of the adjacent peripheral braking strip is no greater than the maximum wear level allowed for said peripheral braking strip.

7. The brake disc as defined in claim 5, wherein double the distance between an internal edge of said throat-like groove and a face of the adjacent peripheral braking strip does not exceed the difference between the starting value and the minimum value of thickness S of the brake disc, with respect to the minimum allowed wear level.

8. A brake disc provided with a visual control means of its wear level, said brake disc including opposite side faces (1,1') each defining a peripheral braking strip (2) on which opposing brake pads act by friction, said peripheral braking strips each having an external circumferential edge, said visual control means comprising an angle shaped groove (7) formed along at least one of said external circumferential edges adjacent said peripheral braking strips.

9. The brake disc as defined in claim 8, wherein said wear level visual control means is formed on each of said opposite side faces (1,1').

10. The brake disc as defined in claim 8, wherein the distance between an internal edge of said angle-shaped groove and a face of the adjacent peripheral braking strip is no greater than the maximum wear level allowed for said peripheral braking strip.

11. The brake disc as defined in claim 9, wherein double the distance between an internal edge of said angle shaped groove and a face of the adjacent peripheral braking strip does not exceed the difference between the starting value and the minimum value of thickness S of the brake disc, with respect to the minimum allowed wear level.

* * * * *